(12) United States Patent
Miyasaka et al.

(10) Patent No.: US 9,694,661 B2
(45) Date of Patent: Jul. 4, 2017

(54) CONTROL DEVICE FOR HYBRID VEHICLE

(71) Applicant: Toyota Jidosha Kabushiki Kaisha, Toyota-shi Aichi-ken (JP)

(72) Inventors: Kenji Miyasaka, Toyota (JP); Hiroatsu Endo, Nagoya (JP); Hiromichi Chuujou, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 292 days.

(21) Appl. No.: 14/477,820

(22) Filed: Sep. 4, 2014

(65) Prior Publication Data

US 2015/0073640 A1 Mar. 12, 2015

(30) Foreign Application Priority Data

Sep. 6, 2013 (JP) ................. 2013-185492

(51) Int. Cl.
| | |
|---|---|
| *B60W 10/02* | (2006.01) |
| *B60W 20/00* | (2016.01) |
| *B60K 6/445* | (2007.10) |
| *B60W 10/06* | (2006.01) |
| *B60W 20/17* | (2016.01) |

(52) U.S. Cl.
CPC ............ *B60K 6/445* (2013.01); *B60W 10/06* (2013.01); *B60W 20/17* (2016.01); *B60W 2422/40* (2013.01); *B60W 2510/0676* (2013.01); *B60W 2510/082* (2013.01); *B60Y 2400/48* (2013.01);
(Continued)

(58) Field of Classification Search
CPC ....... B60K 6/445; B60W 10/06; B60W 20/17; B60W 2510/0676; B60W 2510/082; B60W 2422/40; Y02T 10/6239; Y10S 903/946; B60Y 2400/48
See application file for complete search history.

(56) References Cited

U.S. PATENT DOCUMENTS 8,225,688 B2 * 7/2012 Heinzelmann .......... F16H 3/095
74/331
2003/0183467 A1 10/2003 Kozarekar
(Continued)

FOREIGN PATENT DOCUMENTS

JP 2003-314614 A 11/2003
JP 2004-023985 A 1/2004
(Continued)

*Primary Examiner* — Mussa A Shaawat
(74) *Attorney, Agent, or Firm* — Dinsmore & Shohl LLP (57) ABSTRACT

A hybrid vehicle includes an engine, a first motor generator, a dynamic damper, and a power split mechanism. The dynamic damper includes an output-side rotating member, a spring element, and a second motor generator connected to the output-side rotating member so as to transmit the power. The dynamic damper is configured by connecting the output-side rotating member and the second motor generator via the spring element. The power split mechanism splits a power from the engine to the first motor generator and to the output-side rotating member. The control device includes an electronic control unit. The electronic control unit configured to change execution modes of rattling noise suppression control based on a spring characteristic of the dynamic damper. The rattling noise suppression control is a control to suppress rattling noise resulting from rotational fluctuations of the engine.

6 Claims, 5 Drawing Sheets

(52) U.S. Cl.
CPC ........ *Y02T 10/6239* (2013.01); *Y10S 903/946* (2013.01)

(56) References Cited

U.S. PATENT DOCUMENTS

| | | | | |
|---|---|---|---|---|
| 2011/0319212 A1* | 12/2011 | Kato | ................... | F16H 63/3416 |
| | | | | 475/5 |
| 2012/0111657 A1* | 5/2012 | Hamakita | ............ | B62D 5/0409 |
| | | | | 180/444 |
| 2012/0115619 A1* | 5/2012 | Takenaka | .............. | F16F 15/129 |
| | | | | 464/45 |
| 2013/0118300 A1* | 5/2013 | Hwang | ............... | F16H 57/0006 |
| | | | | 74/572.2 |
| 2013/0244799 A1* | 9/2013 | Sugiyama | ........... | F16F 15/1392 |
| | | | | 464/46 |
| 2014/0248991 A1* | 9/2014 | Harada | .................. | B60K 6/445 |
| | | | | 477/3 |
| 2015/0024902 A1* | 1/2015 | Hori | ....................... | B60K 6/445 |
| | | | | 477/3 |
| 2015/0353074 A1* | 12/2015 | Kinoshita | .............. | B60K 6/445 |
| | | | | 701/22 |

FOREIGN PATENT DOCUMENTS

| | | |
|---|---|---|
| JP | 2008-201351 A | 9/2008 |
| JP | 2009-281314 A | 12/2009 |
| JP | 2013-121773 A | 6/2013 |
| WO | 2013051143 A1 | 4/2013 |

* cited by examiner

CONTROL DEVICE FOR HYBRID VEHICLE

INCORPORATION BY REFERENCE

The disclosure of Japanese Patent Application No. 2013-185492 filed on Sep. 6, 2013 including the specification, drawings and abstract is incorporated herein by reference in its entirety.

BACKGROUND OF THE INVENTION

1. Field of the Invention

The invention relates to a control device for a hybrid vehicle including a power split mechanism, and particularly to a technique for reducing rattling noise resulting from the rotational fluctuations of an engine.

2. Description of Related Art

A hybrid vehicle has been widely available which includes a differential mechanism that splits power from an engine to a first motor generator (MG) and an output-side rotating member, and a second MG connected to the output-side rotating member to be capable of transmitting the power. In such a hybrid vehicle, vibration due to the rotational fluctuations of an engine resulting from the torque fluctuations of the engine is transmitted to the meshing portions of a gear pair. As a result, in the meshing portions, the tooth surfaces of the meshing teeth strike each other by repeatedly colliding with and separating from each other. This may cause rattling noise referred to as a so-called rattling sound. It is disclosed in Japanese Patent Application Publication No. 2003-314614 (JP 2003-314614 A) that, to reduce such a rattling sound, a dynamic damper is configured by connecting a motor (corresponding to the foregoing second MG) to a rotation element to which the power of an engine is transmitted via a spring and, using the inertia of the motor in combination with the spring, torsional resonance vibration is reduced. It is also disclosed in each of Japanese Patent Application Publication No. 2004-23985 (JP 2004-23985) and Japanese Patent Application Publication No. 2008-201351 (JP 2008-201351 A) that, to reduce the rattling sound, rattling sound suppression control (synonymous with rattling noise suppression control) which changes the operating point of an engine is executed.

SUMMARY OF THE INVENTION

In the dynamic damper described above, as also described in JP 2003-314614 A, by adjusting the spring constant of the spring, the natural frequency of the dynamic damper can be tuned to a value within a range which allows a reduction in torsional resonance vibration. From another viewpoint, this means that, when the spring characteristic of the dynamic damper changes, the effect of reducing the rattling sound provided by the dynamic damper changes. Accordingly, due to the changing of the spring characteristic of the dynamic damper from the intended spring characteristic, it may be difficult to suppress the rattling sound. In addition, when the rattling sound suppression control described above is performed irrespective of the spring characteristic of the dynamic damper, the operating point of the engine may be needlessly changed to deteriorate fuel efficiency. Note that a problem as described above has not been available yet. It has not been proposed yet to execute rattling sound suppression control in consideration of a change in the spring characteristic of a dynamic damper.

The invention provides a control device for a hybrid vehicle which properly performs rattling sound suppression control in accordance with the spring characteristic of a dynamic damper.

One aspect of the invention is a control device for a hybrid vehicle. The hybrid vehicle includes an engine, a first motor generator, a dynamic damper, and a power split mechanism. The dynamic damper includes an output-side rotating member, a spring element, and a second motor generator connected to the output-side rotating member so as to transmit a power. The dynamic damper is configured by connecting the output-side rotating member and the second motor generator via the spring element. The power split mechanism splits the power from the engine to the first motor generator and to the output-side rotating member. The control device includes an electronic control unit. The electronic control unit configured to change execution modes of rattling noise suppression control based on a spring characteristic of the dynamic damper. The rattling noise suppression control is a control to suppress rattling noise resulting from rotational fluctuations of the engine.

According to the foregoing aspect, the rattling sound suppression control can properly be performed in accordance with the spring characteristic of the dynamic damper. That is, when the rattling sound can sufficiently be suppressed using the dynamic damper, the rattling sound suppression control is executed in the execution mode with highest fuel efficiency. This allows the rattling sound to be suppressed, while preventing the deterioration of the fuel efficiency. On the other hand, when the rattling sound cannot sufficiently be suppressed using the dynamic damper, the rattling sound suppression control is executed in the execution mode with highest rattling sound suppressing effect. Thus, the rattling sound can be suppressed by the rattling sound suppression control.

In the foregoing aspect, the electronic control unit may also be configured to acquire the spring characteristic based on a temperature of the dynamic damper. According to the foregoing aspect, the rattling sound suppression control is properly performed in accordance with the temperature of the dynamic damper which changes the spring characteristic. This allows the rattling sound to be properly suppressed.

In the foregoing aspect, the electronic control unit may also be configured to acquire the spring characteristic based on a rotation behavior of the second MG and a rotation behavior of the output-side rotating member. According to the foregoing aspect, the rattling sound suppression control is performed properly in accordance with the acquired spring characteristic. This allows the rattling sound to be properly suppressed.

In the foregoing aspect, the electronic control unit may also be configured to acquire the spring characteristic based on variation with time of the spring characteristic of the dynamic damper. According to the foregoing aspect, the rattling sound suppression control is performed properly in accordance with the variation with time of the spring characteristic of the dynamic damper. This allows the rattling sound to be properly suppressed.

In the foregoing aspect, the electronic control unit may also be configured to execute the rattling noise suppression control when a torque of the second MG is within a predetermined range including a value of zero. According to the foregoing aspect, when the torque of the second MG is within the predetermined range including the value of zero, i.e., when the rattling sound is more likely to be generated, the rattling sound suppression control can be performed properly in accordance with the spring characteristic of the dynamic damper. On the other hand, when the torque of the second MG is out of the predetermined range including the value of zero, i.e., when the rattling sound is less likely to be generated, the deterioration of the fuel efficiency resulting from executing the rattling sound suppression control is avoided.

In the foregoing aspect, the electronic control unit may also be configured to execute the rattling noise suppression control in which an operating line of the engine is set to a rattling-noise-suppression operating line determined in advance, and the electronic control unit is configured to select, when changing the execution modes of the rattling noise suppression control, the rattling-noise-suppression operating line to be used for the rattling noise suppression control from among a plurality of rattling-noise-suppression operating lines based on the spring characteristic. According to the foregoing aspect, when the rattling sound can sufficiently be suppressed using the dynamic damper, it is possible to suppress the rattling sound while preventing the deterioration of the fuel efficiency. On the other hand, when the rattling sound cannot sufficiently be suppressed using the dynamic damper, the rattling sound can be suppressed by the rattling sound suppression control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
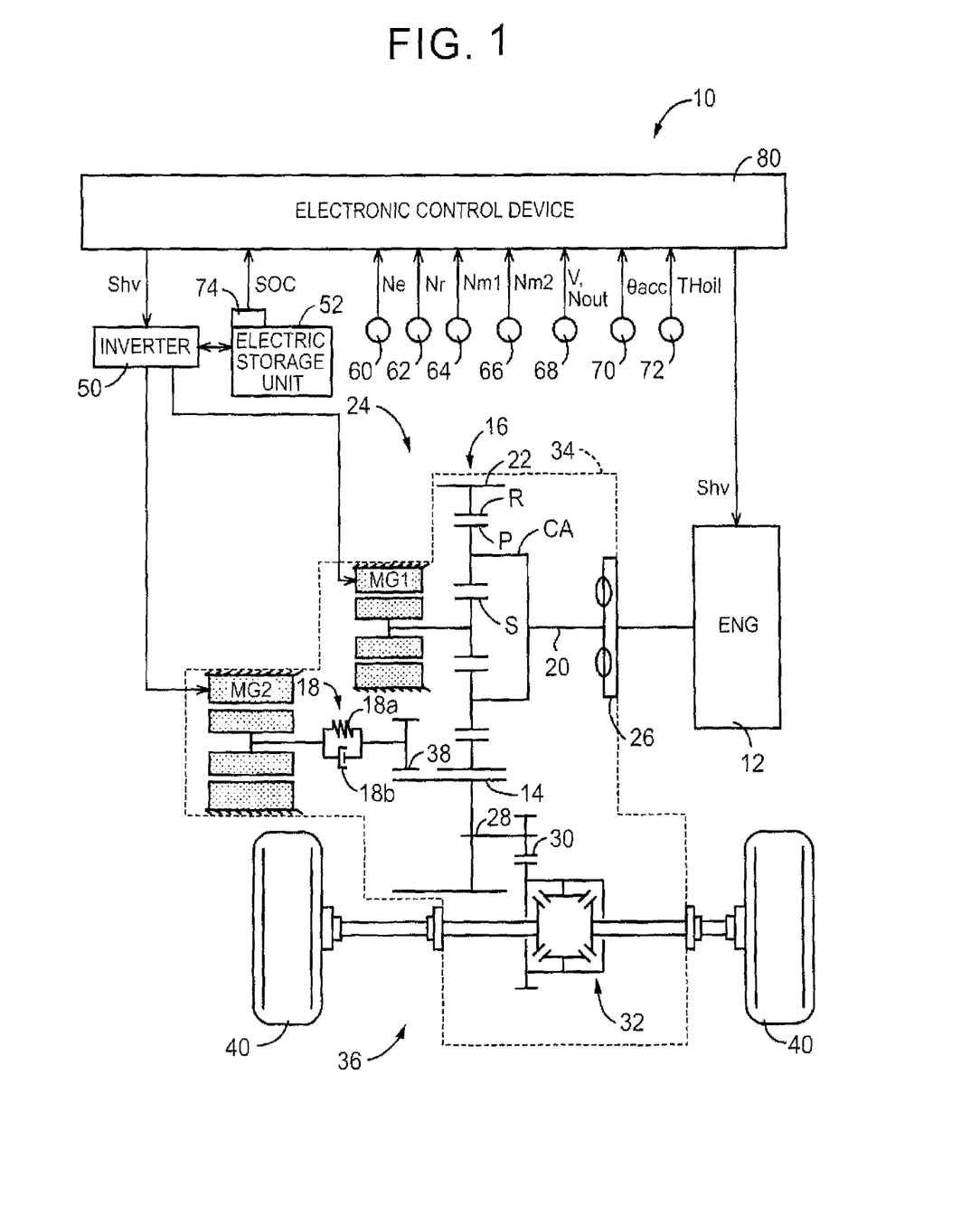
FIG. 1 is a view illustrating a schematic configuration of a hybrid vehicle to which the invention is applied and also illustrating the main portion of a control system for various control in the vehicle.

Referring now to the drawings, embodiments of the invention will be described below in detail. FIG. 1 is a view illustrating a schematic configuration of a hybrid vehicle 10 (hereinafter referred to as the vehicle 10) to which the invention is applied. FIG. 1 is also a view illustrating the main portion of a control system for various control in the vehicle 10. In FIG. 1, the vehicle 10 includes an engine 12 as a running drive power source, a first MG 1, a second MG2, a counter driven gear 14 as an output-side rotating member, a power split mechanism 16 which splits the power output from the engine 12 to the first MG1 and to the counter driven gear 14, and a dynamic damper 18 which connects the second MG2 to the counter driven gear 14 so as to transmit the power.

The power split mechanism 16 is formed of a conventional single-pinion-type planetary gear unit including a sun gear (S), a pinion gear (P), a carrier (CA) which supports the pinion gear so as to allow rotation and revolution thereof, and a ring gear (R) which meshes with the sun gear via the pinion gear each as a rotation element (rotating member). The power split mechanism 16 functions as a differential mechanism which provides a differential action. The carrier is connected to the engine 12 via an input shaft 20. The sun gear is connected to the first MG1. The ring gear formed integrally with a counter drive gear 22 is connected to the counter driven gear 14. In the power split mechanism 16 thus configured, the first MG1 generates electricity with the power from the engine 12 split to the first MG1. Then, the generated electric energy is stored in an electric storage unit 52 via an inverter 50 and the second MG2 is driven to rotate by the electric energy. Thus, in the vehicle 10, a transmission section 24 as an electric differential section is configured in which the operating state of the first MG1 is controlled to control the differential state of the power split mechanism 16. The transmission section 24 functions as an electrically controlled continuously-variable transmission having a speed ratio γat (=Engine Rotation Speed Ne/Ring Gear Rotation Speed Nr) which is continuously changed. Accordingly, the transmission section 24 can activate the engine 12 at, e.g., a fuel efficiency optimum point as the operating point of the engine 12 which maximizes fuel efficiency. The foregoing operating point of the engine 12 shows the operating state of the engine 12 determined by, e.g., the engine rotation speed Ne and an engine torque Te. The foregoing operating point of the engine 12 is hereinafter referred to as the engine operating point. A hybrid form of this type is referred to as a mechanical split type or a split type.

The vehicle 10 includes, e.g., a damper 26 operationally connected to the engine 12, the input shaft 20 operationally connected to the damper 26, the transmission section 24 connected to the input shaft 20, the counter driven gear 14 meshing with the counter drive gear 22 as the output gear of the transmission section 24, a final gear 30 (having a diameter smaller than that of the counter driven gear 14) provided concentrically with a counter shaft 28 as the rotation shaft of the counter driven gear 14, a differential gear 32 meshing with the final gear 30 via a differential ring gear, and the like. In a case 34 as a non-rotating member attached to a vehicle body, these components form a part of a power transmission unit 36 as a transaxle (T/A). In the vehicle 10, e.g., the dynamic damper 18 operationally connected to the second MG2, a reduction gear 38 operationally connected to the dynamic damper 18, the counter driven gear 14 meshing with the reduction gear 38, the final gear 30, the differential gear 32; and the like also form a part of the power transmission unit 36 in the case 34. In the power transmission unit 36 thus configured, the power from the engine 12 and the power from the second MG2 are transmitted to the counter driven gear 14. From the counter driven gear 14, the power from the engine 12 and the power from the second MG2 are transmitted to a pair of drive wheels 40 successively through the final gear 30, the differential gear 32, a pair of axle shafts, and the like. Note that the vehicle 10 is provided with an oil pump (not shown) which is driven to rotate by the input shaft 20 that has been driven to rotate by the engine 12. The oil pump supplies operating oil used to lubricate or cool each of the sections of the power transmission unit 36 such as, e.g., the power split mechanism 16, the dynamic damper 18, the differential gear 32, the reduction gear 38, and ball bearings (not shown).

The first MG1 and second MG2 are, e.g., synchronous MGs each having at least one of the function of a motor which generates a mechanical drive force from an electric energy and the function of a generator which generates an electric energy from a mechanical drive force. Preferably, each of the first MG1 and second MG2 is a MG selectively activated as a motor or a generator. For example, the first MG1 has a generator (electric generator) function for providing a reaction force to the power of the engine 12 and a motor (MG) function for driving the engine 12 in a shutdown state to rotate. The second MG2 has an MG function for outputting a drive force as a running drive power source and an electric generator function for generating an electric energy from a reverse drive force from the drive wheel 40 side through regeneration. The first MG1 is directly connected to the sun gear. The second MG2 is connected to the counter driven gear 14 via the dynamic damper 18 and the reduction gear 38 to be capable of transmitting the power. The reduction gear 38 has a diameter smaller than that of the counter driven gear 14. Accordingly, the rotation of the second MG2 is decelerated and then transmitted to the counter driven gear 14.

The dynamic damper 18 has, e.g., a spring element 18d and a dashpot element 18b. The dynamic damper 18 is configured by connecting the reduction gear 38 meshing with the counter driven gear 14 and the second MG2 via the spring element 18a. The dynamic damper 18 acts in a rotation direction and a thrust direction. That is, the dynamic damper 18 is configured by being connected to the second MG2 via the spring element 18a and using the second MG2 as a mass.

In the vehicle 10, in a power transmission system (power transmission path or drive line) from the engine 12 to the drive wheels 40, abnormal noise resulting from the rotational fluctuations (explosion fluctuations) of the engine 12 may be generated. For example, when the rotational fluctuations of the engine 12 having a force stronger than a force which presses the intermeshing gear teeth against each other in the meshing portions of the gears in the power transmission system are transmitted to the power transmission system, the fluctuations are amplified by driving torsional resonance forced by the inputting of the rotational fluctuations of the engine 12 to possibly cause a clattering sound (rattling sound) through backlash. The backlash is e.g., the gap between the meshing portions of the gears in the power transmission system. To attenuate such vibration in driving torsional resonance, the dynamic damper 18 is provided in the vehicle 10. The dynamic damper 18 has been tuned by preliminarily adjusting the spring constant of the spring element 18a by means of experiment or design, i.e., preliminarily adjusting the spring characteristic (torsional resonance point and attenuation characteristic) thereof by means of experiment or design to attenuate the vibration in driving torsional resonance.

The vehicle 10 is provided with an electronic control unit 80 (a control device) for the vehicle 10 related to the control of, e.g., the engine 12, the transmission section 24 or the like. The electronic control unit 80 is configured to include a so-called microcomputer including, e.g., a central processing unit (CPU), a random access memory (RAM), a read only memory (ROM), an input/output interface, and the like. The CPU performs signal processing in accordance with the program stored in advance in the ROM while using the temporary storage function of the RAM to execute various control over the vehicle 10. For example, the electronic control unit 80 is configured to execute vehicle control such as hybrid drive control related to the engine 12, the first MG1, the second MG2, and the like. As necessary, the electronic control unit 80 is configured to be divided into parts for individually controlling an output of the engine 12, outputs of the MG1 and MG2, and the like. To the electronic control unit 80, various signals from the sensors provided in the vehicle 10 are supplied. The various sensor signals are based on values detected by, e.g., an engine rotation speed sensor 60, a ring-gear rotation speed sensor 62, a first MG1 rotation speed sensor 64 such as a resolver, a second MG2 rotation speed sensor 66 such as a resolver, an output rotation speed sensor 68, an accelerator depression amount sensor 70, an oil temperature sensor 72, a battery sensor 74, and the like. Examples of the various signals include the engine rotation speed Ne, the ring gear rotation speed Nr corresponding to the rotation speed of the counter drive gear 22, a first MG1 rotation speed Nm1, a second MG2 rotation speed Nm2, an output rotation speed Nout as the rotation speed of the counter driven gear 14 corresponding to a vehicle speed V, an accelerator depression amount θacc corresponding to the driving amount required by the driver of the vehicle 10, a transaxle oil temperature THoil as the temperature of the operating oil supplied to the power transmission unit 36, the state of charge (SOC) (charging capacity) of the electric storage unit 52, and the like. From the electronic control unit 80, various output signals are supplied to the individual units (such as, e.g., the engine 12 and the inverter 50) of the vehicle 10. Examples of the various output signals include a hybrid control command signal Shv such as an engine control command signal or an MG control command signal (transmission control command signal).

Figure 2:
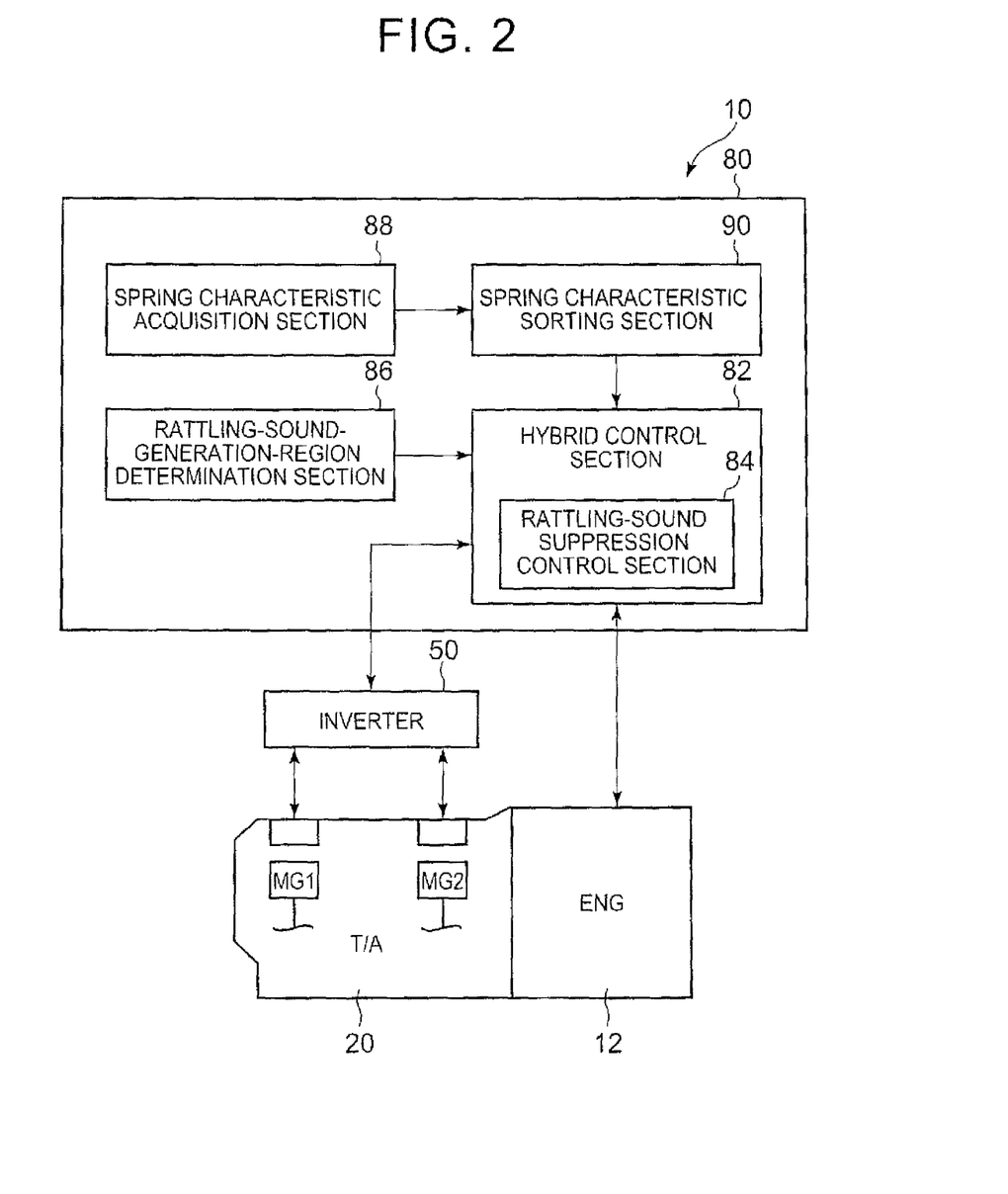
FIG. 2 is a block diagram illustrating the main portion of the control function of an electronic control unit.

FIG. 2 is a functional block diagram illustrating the main portion of the control function performed by the electronic control unit 80. In FIG. 2, the electronic control unit 80 includes hybrid control means, i.e., a hybrid control section 82.

The hybrid control section 82 selectively establishes, e.g., a motor running mode, an engine running mode (steady running mode), assisted running mode (accelerated running mode), or the like depending on the running state. The motor running mode exclusively uses the second MG2 as a running drive source. In the engine running mode, the vehicle 10 travels by providing the reaction force to the power of the engine 12 through electric generation by the first MG1 to transmit an engine direct torque to the counter driven gear 14 via the counter drive gear 22 and driving the second MG2 with the electric power generated by the first MG1 to transmit the torque to the counter driven gear 14. In the assisted running mode, the vehicle 10 travels by additionally using the drive force of the second MG2 using the power from the electric storage unit 52 in the engine, running mode.

By way of example, control in the foregoing engine running mode will be described more specifically. The hybrid control section 82 causes the engine 12 to operate in an operation range with high efficiency. In addition, the hybrid control section 82 optimally changes the split of the drive force between the engine 12 and the second MG2 and the reaction force resulting from the power generation by the first MG1 to control the speed ratio γat of the transmission section 24. For example, the hybrid control section 82 calculates the objective output (required output) of the vehicle 10 from the accelerator depression amount θacc and the vehicle speed V. The hybrid control section 82 then calculates a total required objective output from the objective output and a required charging value. The hybrid control section 82 calculates an objective engine power Petgt in consideration of a transmission loss, an auxiliary load, the assist torque of the second MG2, and the like so as to obtain the total objective output. Then, the hybrid control section 82 controls the engine 12 as well as the amount of electricity generated by the first MG1 so as to allow the engine 12 to be activated at, e.g., an engine operating point (Engine Rotation Speed Ne and Engine Torque Te). The engine operating point is the fuel efficiency optimum point which provides the objective engine power Petgt. The fuel efficiency optimum point lies on a conventional engine fuel efficiency optimum line which is the operating line of the engine 12 (engine operating line) for balancing driving performance and fuel efficiency performance and has been obtained in advance by way of experiment or design and stored (i.e., determined in advance). Note that, in the embodiment, the fuel efficiency is, e.g., a running distance per unit fuel consumption, the fuel consumption rate (=Fuel Consumption/Drive Wheel Output) of the entire vehicle, or the like.

For throttle control, the hybrid control section 82 performs open/close 15, control of an electronic throttle valve using a throttle actuator. Besides, the hybrid control section 82 controls, for fuel injection control, the amount of fuel injection or the timing of injection by a fuel injector. The hybrid control section 82 outputs an engine control command signal for controlling, for ignition timing control, the timing of ignition by an igniter. The hybrid control section 82 executes output control of the engine 12 so as to obtain the engine torque Te for generating the objective engine power Petgt. The hybrid control section 82 also outputs an MG control command signal for controlling power generation by the first MG1 to the inverter 50 to control the first MG rotation speed Nm1 so as to obtain the engine rotation speed Ne for generating the objective engine power Petgt.

As described above, in the vehicle 10, the vibration in driving torsional resonance is attenuated using the dynamic damper 18 to suppress the generation of a rattling sound resulting from the rotational fluctuations of the engine 12. In the embodiment, to further suppress the generation of the rattling sound, the hybrid control section 82 functionally includes a rattling-sound suppression control section 84 which executes rattling sound suppression control (rattling noise suppression control) for suppressing the generation of the rattling sound resulting from the rotational fluctuations of the engine 12. The driving torsional resonance results from a match between the frequency of engine vibration and the resonance frequency of the power transmission system. Accordingly, the rattling-sound suppression control section 84 changes the engine operating point, while maintaining the objective engine power Petgt, to execute the rattling sound suppression control.

Here, in the engine running mode, when the second MG2 is in a no-load state or in a state close to the no-load state, a second MG torque Tm2 which acts on the meshing portions of the gears is small relative to the torque fluctuations of the engine 12 transmitted to the meshing portions. Accordingly, it can be considered that the rattling sound is more likely to be generated in the reduction gear 38 or the like. When the second MG2 is in the no-load state or in a state close to the no-load state, the second MG torque Tm2 is in a prescribed range including a value of 0 [Nm], i.e., nearly zero. In the embodiment, the prescribed range of the second MG torque Tm2 in which such a rattling sound may be generated is referred to as a rattling sound generation region (rattling noise generation region) G. The rattling sound generation region G is a torque region determined in advance as the range of the second MG torque Tm2 where a rattling sound resulting from the rotational fluctuations of the engine 12 is more likely to be generated between the meshing portions of the intermeshing gears in, e.g., the transmission section 20. The meshing portions of the intermeshing gears in the transmission section 24 are particularly the meshing portions of the intermeshing gears, which are the reduction gear 38 and the counter driven gear 14. The rattling sound generation region G is an example during engine running when, e.g., the second MG torque Tm2 is nearly zero and the second MG2 is in a floating state.

The electronic control unit 80 further includes a rattling-sound-generation-region determination section 86. The rattling-sound-generation-region determination section 86 determines, e.g., whether or not the second MG torque Tm2 is in the rattling sound generation region G. Specifically, the rattling-sound-generation-region determination section 86 determines whether or not the absolute value (=|Tm2|) of an MG control command value given by the hybrid control section 82 to the second MG2 is not more than a rattling sound generation threshold value A [Nm] corresponding to the rattling sound generation region G.

When the rattling-sound-generation-region determination section 86 determined that the second MG torque Tm2 is not in the, rattling sound generation region G, the rattling-sound suppression control section 84 activates the engine 12 at the engine operating point which provides the objecting engine power Petgt and serves as the fuel efficiency optimum point. On the other hand, when the rattling-sound-generation-region determination section 86 determined that the second MG torque Tm2 is in the rattling sound generation region G, the rattling-sound suppression control section 84 executes the rattling sound suppression control. Specifically, instead of activating the engine 12 at the foregoing fuel efficiency optimum point, the rattling-sound suppression control section 84 executes the rattling noise suppression control which activates the engine 12 at the engine operating point corresponding to a rattling-noise-suppression operating point (rattling-sound-suppression operating point) determined in advance to reduce the rattling sound while maintaining the objective engine power Petgt. In the rattling sound suppression control, the engine operating point is changed from the fuel efficiency optimum point, which causes the deterioration of the fuel efficiency. However, in the rattling sound suppression control, a consideration has been given to the rattling sound suppressing effect achieved by the dynamic damper 18. Consequently, the deterioration of the fuel efficiency is minimized, while the generation of the rattling sound is further suppressed.

The spring characteristic of the dynamic damper 18 may change from the intended spring characteristic when adjusted in advance. As a result, when the rattling sound suppression control is executed in a unique execution mode corresponding to the intended spring characteristic, the desired rattling sound suppressing effect may not be able to be obtained. To prevent this, the electronic control unit 80 is configured to switch the execution modes of the rattling sound suppression control (changes the execution modes of the rattling sound suppression control) based on the spring characteristic of the dynamic damper 18.

It can be considered that the rigidity of the spring element 18a changes depending on the temperature of the dynamic damper 18 in such a manner as to lower in a high-temperature environment. That is, it can be considered that the spring characteristic of the dynamic damper 18 varies with the temperature of the dynamic damper 18. Accordingly, the electronic control unit 80 switches the execution modes of the raffling sound suppression control (changes the execution modes) based on the temperature of the dynamic damper 18. For example, in the rattling sound suppression control in the temperature range of the dynamic damper 18 which provides the intended spring characteristic, the engine operating point is set to the rattling-sound-suppression operating point which minimizes the deterioration of the fuel efficiency, while further suppressing the generation of the rattling sound. On the other hand, in the rattling sound suppression control in the temperature range of the dynamic damper 18 out of the temperature range which provides the intended spring characteristic, the engine operating point is set to a rattling-sound-suppression operating point in accordance with an unintended spring characteristic so as to be able to properly suppress the generation of the rattling sound even though the fuel efficiency is deteriorated.

Specifically, the electronic control unit 80 includes a spring characteristic acquisition section 88, and a spring characteristic sorting section 90. The spring characteristic acquisition section 88 acquires the spring characteristic of the dynamic damper 18. As described above, the spring characteristic of the dynamic damper 18 changes depending on the temperature of the dynamic damper 18 so that the temperature of the dynamic damper 18 represents the spring characteristic of the dynamic damper 18. Accordingly, the spring characteristic acquisition section 88 acquires the spring characteristic of the dynamic damper 18 based on, e.g., the temperature of the dynamic damper 18. That is, by acquiring the temperature of the dynamic damper 18, the spring characteristic acquisition section 88 acquires the spring characteristic of the dynamic damper 18. As the temperature of the dynamic damper 18, a value directly detected by the temperature sensor attached to the dynamic damper 18 or the like may also be used. Alternatively, as the temperature of the dynamic damper 18, the transaxle oil temperature THoil corresponding to the temperature of the operating oil supplied to the dynamic damper 18 may also be used.

The spring characteristic sorting section 90 sorts the spring characteristic of the dynamic damper 18 acquired by the spring characteristic acquisition section 88. Specifically, the spring characteristic sorting section 90 sorts the spring characteristic of the dynamic damper 18 acquired by the spring characteristic acquisition section 88 in accordance with the execution mode of the rattling sound suppression control that has been determined in advance in accordance with the spring characteristic of the dynamic damper 18.

Figure 3:
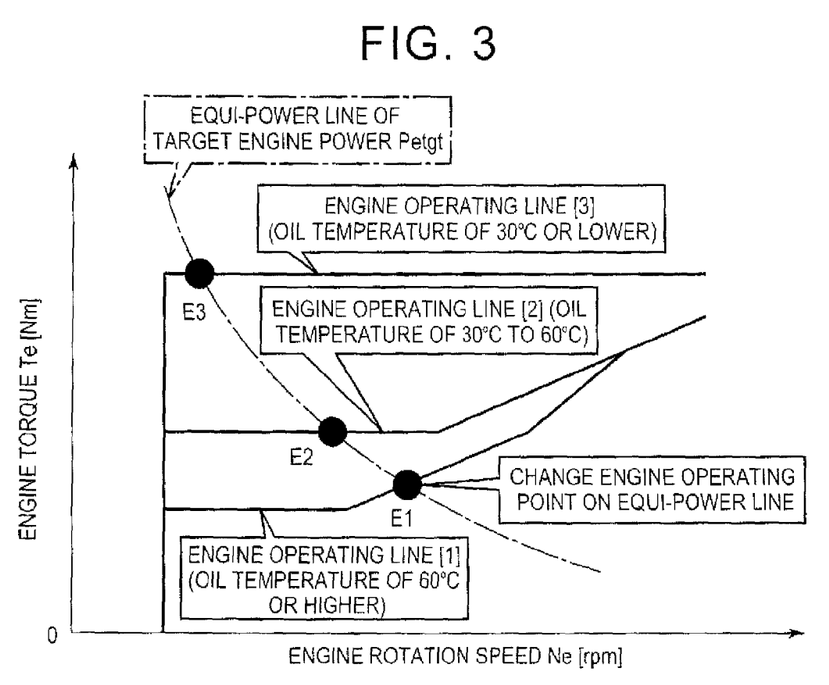
FIG. 3 is a view illustrating an example of engine operating lines in accordance with spring characteristics, which have been determined in advance as the plurality of execution modes of rattling sound suppression control.

The foregoing execution mode of the rattling sound suppression control that has been determined in advance includes the single or plurality of execution modes of the rattling sound suppression control. Examples thereof include not only the execution mode of the rattling sound suppression control in accordance with the intended spring characteristic, but also the execution mode of the rattling sound suppression control in accordance with a spring characteristic other than the intended spring characteristic. Specifically, as shown in FIG. 3, as the plurality of execution modes of the rattling sound suppression control, engine operating lines in accordance with the spring characteristics have been determined in advance: In FIG. 3, when a predetermined temperature range determined in advance as the range of the transaxle oil temperature THoil which provides the intended spring characteristic is, e.g., from 30° [C.]to 60° [C. ], as the engine operating line in accordance with the intended spring characteristic, e.g., an engine operating line [2] has been determined in advance. Also, as the engine operating line in accordance with the spring characteristic corresponding to a higher temperature range over the predetermined temperature range, e.g., an engine operating line [1] has been determined in advance. Also, as the engine operating line in accordance with the spring characteristic corresponding to a lower temperature range under the predetermined temperature range, e.g., an engine operating line [3] has been determined in advance. The engine operating line [2] is closest to, e.g., the engine fuel efficiency optimum line. Similarly to the engine fuel efficiency optimum line, each of the engine operating lines is a set of engine operating points which can be varied using the objective engine power Petgt as a parameter.

When the engine operating lines in accordance with the spring characteristics have been determined in advance as in FIG. 3, the spring characteristic sorting section 90 determines whether or not the transaxle oil temperature THoil is over 60°[C.]. When the transaxle oil temperature THoil is not over 60° [C.], the spring characteristic sorting section 90 determines whether or not the transaxle oil temperature THoil is over 30° [C.].

The rattling-sound suppression control section 84 executes the rattling sound suppression control in the execution mode of the rattling sound suppression control determined in advance in accordance with the spring characteristic of the dynamic damper 18 based on the spring characteristic of the dynamic damper 18 sorted by the spring characteristic sorting section 90. Specifically, the rattling-sound suppression control section 84 executes the rattling sound suppression control as follows. In the rattling sound suppression control, the rattling-sound suppression control section 84 selects the engine operating line determined in advance in accordance with the spring characteristic on the basis of the sorting of the spring characteristic by the spring characteristic sorting section 90. Then, the rattling-sound suppression control section 84 activates the engine 12 at the engine operating point corresponding to the rattling-sound-suppression operating point which is on the engine operating line and provides the objective engine power Petgt. Thus, the rattling-sound suppression control section 84 executes the rattling sound suppression control in which the engine operating line is set to the rattling-sound-suppression operating line determined in advance. The rattling-sound suppression control section 84 selects, from among the plurality of the rattling-sound-suppression operating lines, the rattling-sound-suppression operating line to be used for the rattling sound suppression control on the basis of the spring characteristic of the dynamic damper 18 to switch the execution modes of the rattling sound suppression control (change the execution modes). In other words, by selecting the rattling-sound-suppression operating point to be used for the rattling sound suppression control from among the plurality of types of rattling-sound-suppression operating points on the basis of the spring characteristic of the dynamic damper 18, the rattling-sound suppression control section 84 switches the execution modes of the rattling sound suppression control (changes the execution modes).

Figure 4:
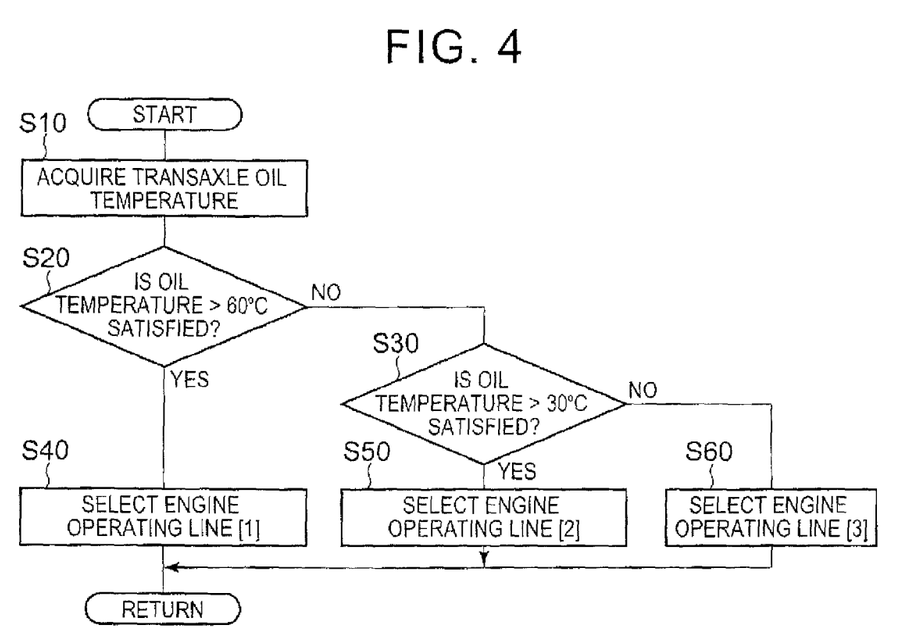
FIG. 4 is a flow chart illustrating the main portion of a control operation by the electronic control unit, i.e., control operation for properly performing the rattling sound suppression control in accordance with the spring characteristic of the dynamic damper.

FIG. 4 is a flow chart illustrating the main portion of a control operation by the electronic control unit 80, i.e., control operation for properly performing the rattling sound suppression control in accordance with the spring characteristic of the dynamic damper 18. The flow chart is repeatedly executed in an extremely short cycle time of, e.g., about several milliseconds to scores of milliseconds. Note that the flow chart of FIG. 4 is started on the assumption that, e.g., the rattling-sound-generation-region determination section 86 has determined that the second MG torque Tm2 is in the rattling sound generation region G, though not shown.

In FIG. 4, first, in step S10 (hereinafter "step" is omitted) corresponding to the spring characteristic acquisition section 88, by acquiring, e.g., the transaxle oil temperature THoil corresponding to the temperature of the dynamic damper 18, the spring characteristic of the dynamic damper 18 is acquired. Then, in S20 corresponding to the spring characteristic sorting section 90, it is determined whether or not the transaxle oil temperature THoil acquired in S10 described above is over 60° [C.]. When the result of the determination in S20 described above is negative, it is determined in S30 corresponding to the spring characteristic sorting section 90 whether or not the transaxle oil temperature THoil acquired in S10 described above is over 30° [C.]. When the result of the determination in S20 described above is affirmative, in S40 corresponding to the rattling-sound suppression control section 84, the engine operating line [1] (see FIG. 3) determined in advance is selected. Then, the rattling sound suppression control is executed in which the engine 12 is activated at the engine operating point E1 (see FIG. 3) corresponding to the rattling-sound-suppression operating point which is on the engine operating line [1] and provides the objective engine power Petgt. When the result of the determination in S30 described above is affirmative, in S50 corresponding to the rattling-sound suppression control section 84, the engine operating line [2] (see FIG. 3) determined in advance is selected. Then, the rattling sound suppression control is executed in which the engine 12 is activated at the engine operating point E2 (see FIG. 3) corresponding to the rattling-sound-suppression operating point which is on the engine operating line [2] and provides the objective engine power Petgt. On the other hand, when the result of the determination in S30 described above is negative, in S60 corresponding to the rattling-sound suppression control section 84, the engine operating line [3] (see FIG. 3) determined in advance is selected. Then, the rattling sound suppression control is executed in which the engine 12 is activated at the engine operating point E3 (see FIG. 3) corresponding to the rattling-sound-suppression operating point which is on the engine operating line [3] and provides the objective engine power Petgt.

As described above, according to the embodiment, the execution modes of the rattling sound suppression control are switched (execution modes are changed) based on the spring characteristic of the dynamic damper 18. Accordingly, the rattling sound suppression control can properly be performed in accordance with the spring characteristic of the dynamic damper 18. That is, when the rattling sound can sufficiently be suppressed using the dynamic damper 18, the rattling sound suppression control is executed in the execution mode with highest fuel efficiency. This allows the rattling sound to be suppressed, while preventing the deterioration of the fuel efficiency. On the other hand, when the rattling sound cannot sufficiently be suppressed using the dynamic damper 18, the rattling sound suppression control is executed in the execution mode with highest rattling sound suppressing effect. Thus, the rattling sound can be suppressed by the rattling sound suppression control.

Also, according to the embodiment, the spring characteristic is obtained based on the temperature of the dynamic damper 18. Accordingly, by properly performing the rattling sound suppression control in accordance with the temperature of the dynamic damper 18 which varies the spring characteristic, the rattling sound can properly be suppressed.

Also, according to the embodiment, when the second MG torque Tm2 is in the rattling sound generation region G, the rattling sound suppression control is executed. Accordingly, when the rattling sound is more likely to be generated, the rattling sound suppression control can properly be performed in accordance with the spring characteristic of the dynamic damper 18. On the other hand, when the rattling sound is less likely to be generated, the deterioration of the fuel efficiency resulting from the execution of the rattling sound suppression control is avoided.

Also, in accordance with the embodiment, by selecting the rattling-sound-suppression operating point (rattling-sound-suppression operating line) to be used for the rattling sound suppression control from among the plurality of rattling-sound-suppression operating points (rattling-sound-suppression operating lines) determined in advance on the basis of the spring characteristic of the dynamic damper 18, the execution modes of the rattling sound suppression control are switched (execution modes are changed). Accordingly, when the rattling sound can sufficiently be suppressed using the dynamic damper 18, it is possible to suppress the rattling sound, while preventing the deterioration of the fuel efficiency. On the other hand, when the rattling sound cannot sufficiently be suppressed using the dynamic damper 18, the rattling sound can be suppressed by the rattling sound suppression control.

Next, another embodiment of the invention will be described. Note that, in the following embodiment, parts common to the embodiments are designated by the same reference numerals and a description thereof is omitted.

In Embodiment 1 described above, the spring characteristic acquisition section 88 acquires the spring characteristic of the dynamic damper 18 based on the temperature of the dynamic damper 18. Here, the spring characteristic of the dynamic damper 18 can conceivably be recognized from an actual behavior of the dynamic damper 18. For example, the spring characteristic of the dynamic damper 18 can conceivably be recognized from the behaviors of one rotating member and the other rotating member each connected to the dynamic damper 18. Therefore, in the embodiment, the spring characteristic acquisition section 88 acquires the spring characteristic of the dynamic damper 18 on the basis of the rotation behavior of the second MG2 and the rotation behavior of the counter driven gear 14 instead of or in addition to the temperature of the dynamic damper 18 used in the embodiment described above.

Specifically, when fluctuations in the output rotation speed Nout relative to fluctuations in the second MG rotation speed Nm2 are within a predetermined fluctuation range determined in advance which provides the intended spring characteristic, the spring characteristic acquisition section 88 assumes that the spring characteristic of the dynamic damper 18 is a spring characteristic B. On the other hand, when fluctuations in the output rotation speed Nout relative to fluctuations in the second MG rotation speed Nm2 are out of the foregoing predetermined fluctuation range and in a fluctuation range that has been determined in advance to include fluctuations corresponding to the spring characteristic in a high-temperature environment, the spring characteristic acquisition section 88 assumes that the spring characteristic of the dynamic damper 18 is a spring characteristic A. On the other hand, when fluctuations in the output rotation speed Nout relative to fluctuations in the second MG rotation speed Nm2 are out of the foregoing predetermined fluctuation range and in a fluctuation range that has been determined in advance to include fluctuations corresponding to the spring characteristic in a low-temperature environment, the spring characteristic acquisition section 88 assumes that the spring characteristic of the dynamic damper 18 is a spring characteristic C.

Figure 5:
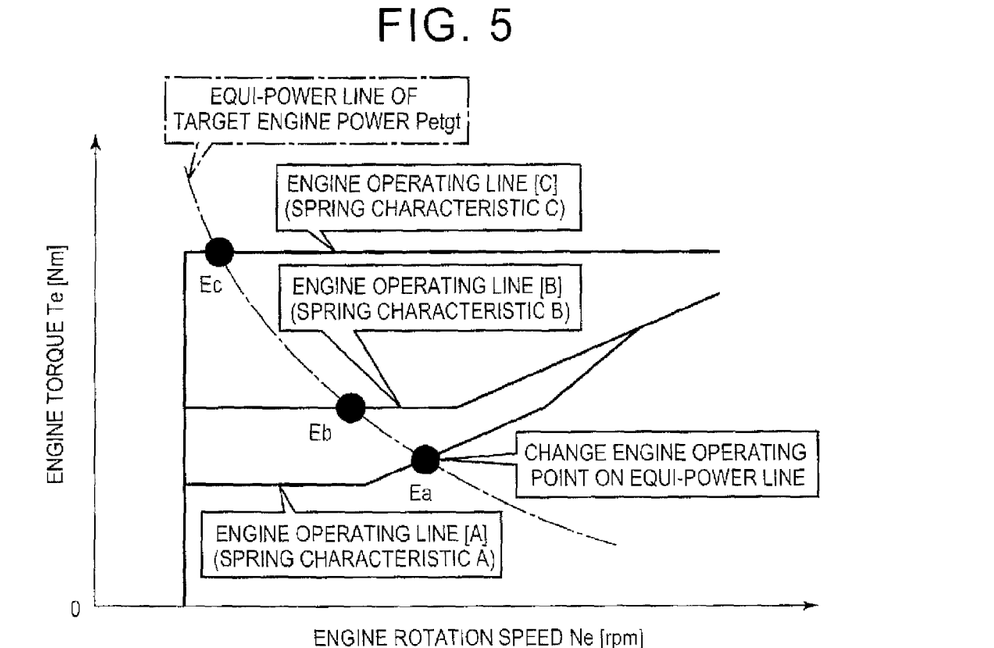
FIG. 5 is a view illustrating an example of engine operating lines in accordance with the spring characteristics, which have been determined in advance as the plurality of execution modes of the rattling sound suppression control in an embodiment different from that in FIG. 3.

As shown in FIG. 5, as the plurality of execution modes of the rattling sound suppression control, the engine operating lines in accordance with the spring characteristics have been determined in advance. In FIG. 5, as the engine operating lines in accordance with the individual spring characteristics A, B, and C, e.g., engine operating lines [A], [B], and [C] have been determined in advance. The engine operating line [B] corresponds to the engine operating line [2] in FIG. 3 and is closest to, e.g., the engine fuel efficiency optimum line. On the other hand, the engine operating lines [A] and [C] respectively correspond to the engine operating lines [1] and [3] of FIG. 3. When the engine operating lines in accordance with the spring characteristics have been determined in advance as in FIG. 5, the spring characteristic sorting section 90 determines whether or not the spring characteristic of the dynamic damper 18 is the spring characteristic A. When the spring characteristic of the dynamic damper 18 is not the spring characteristic A, the spring characteristic sorting section 90 determines whether or not the spring characteristic of the dynamic damper 18 is the spring characteristic B. When the spring characteristic of the dynamic damper 18 is neither the spring characteristic A nor the spring characteristic B, the spring characteristic sorting section 90 determines that the spring characteristic of the dynamic damper 18 is the spring characteristic C.

Figure 6:
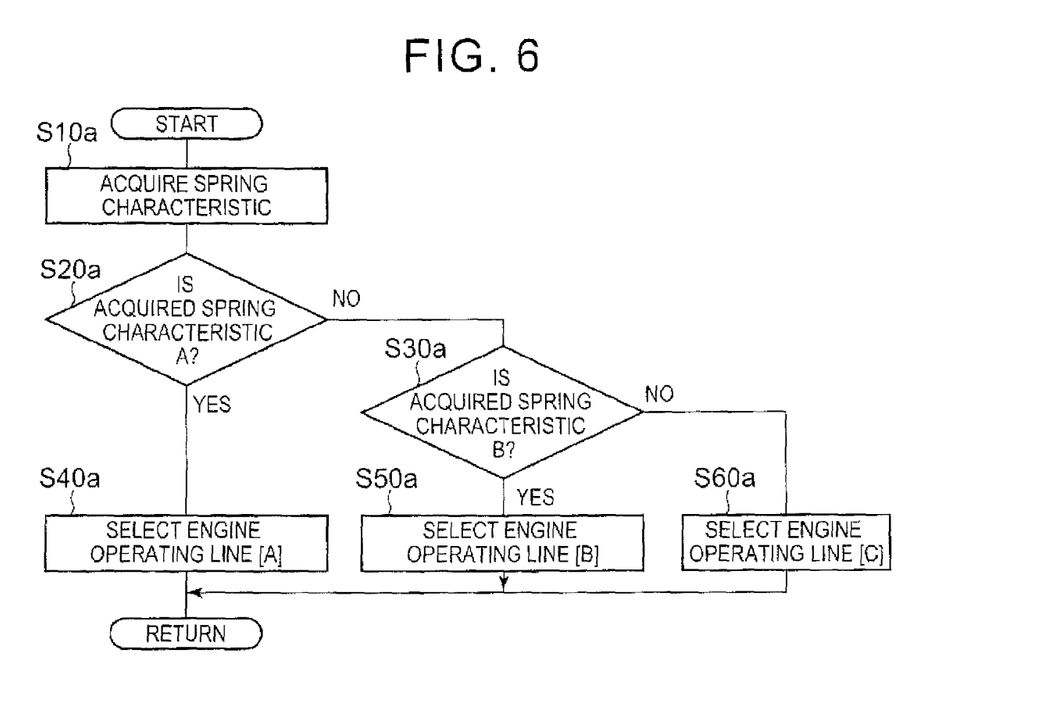
FIG. 6 is a flow chart illustrating the main portion of a control operation by the electronic control unit, i.e., control operation for properly performing the rattling sound suppression control in accordance with the spring characteristic of the dynamic damper in an embodiment different from that in FIG. 4.

FIG. 6 is a flow chart illustrating the main portion of a control operation by the electronic control unit 80, i.e., control operation for properly performing the rattling sound suppression control in accordance with the spring characteristic of the dynamic damper 18. The flow chart is repeatedly executed in an extremely short cycle time of, e.g., about several milliseconds to scores of milliseconds. The flow chart of FIG. 6 is another embodiment corresponding to the flow chart of FIG. 4 in Embodiment 1 described above. Similarly to the flow chart of FIG. 4, the flow chart of FIG. 6 is started on the assumption that, e.g., the rattling-sound-generation-region determination section 86 has determined that the second MG torque Tm2 is in the rattling sound generation region G.

In FIG. 6, first, in S10a corresponding to the spring characteristic acquisition section 88, the spring characteristic of the dynamic damper 18 is acquired based on, e.g., the rotation behavior of the second MG2 and the rotation behavior of the counter driven gear 14. Then, it is determined in S20a corresponding to the spring characteristic sorting section 90 whether or not the spring characteristic of the dynamic damper 18 acquired in S10a described above is the spring characteristic A. When the result of the determination in S20a is negative, it is determined in S30a corresponding to the spring characteristic sorting section 90 whether or not the spring characteristic of the dynamic damper 18 acquired in S10a described above is the spring characteristic B. When the result of the determination in S20a described above is affirmative, in S40a corresponding to the rattling-sound suppression control section 84, the engine operating line [A] (see FIG. 5) determined in advance is selected. Then, the rattling sound suppression control is executed in which the engine 12 is activated at an engine operating point Ea (see FIG. 5) corresponding to the rattling-sound-suppression operating point which is on the engine operating line [A] and provides the objective engine power Petgt. When the result of the determination in S30a described above is affirmative, in S50a corresponding to the rattling-sound suppression control section 84, the engine operating line [B] (see FIG. 5) determined in advance is selected. Then, the rattling sound suppression control is executed in which the engine 12 is activated at an engine operating point Eb (see FIG. 5) corresponding to the rattling-sound-suppression operating point which is on the engine operating line [B] and provides the objective engine power Petgt. On the other hand, when the result of the determination in S30a described above is negative, in S60a corresponding to the rattling-sound suppression control section 84, the engine operating line [C] (see FIG. 5) determined in advance is selected. Then, the rattling sound suppression control is executed in which the engine 12 is activated at an engine operating point Ec (see FIG. 5) corresponding to the rattling-sound-suppression operating point which is on the engine operating line [C] and provides the objective engine power Petgt.

As described above, in accordance with the embodiment, the spring characteristic of the dynamic damper 18 is acquired based on the rotation behavior of the second MG2 and the rotation behavior of the counter driven gear 14. Accordingly, by properly performing the rattling sound suppression control in accordance with the acquired spring characteristic, the rattling sound can properly be suppressed.

In Embodiment 1 described above, the spring characteristic acquisition section 88 acquires the spring characteristic of the dynamic damper 18 on the basis of the temperature of the dynamic damper 18. Here, it can be considered that the spring characteristic of the dynamic damper 18 varies with time. Therefore, in the embodiment, the spring characteristic acquisition section 88 acquires the spring characteristic of the dynamic damper 18 on the basis of the variation with time of the spring characteristic of the dynamic damper 18 instead of or in addition to the temperature of the dynamic damper 18 used in Example 1 described above and the rotation behavior of the second MG2 and the rotation behavior of the counter driven gear 14 each used in Embodiment 2 described above. Thus, the electronic control unit 80 switches the execution modes (changes the execution modes) of the rattling sound suppression control on the basis of the variation with time of the spring characteristic of the dynamic damper 18.

Specifically, when a total travel distance or a total running time in the vehicle 10 is riot more than a predetermined value a determined in advance which provides the intended spring characteristic, the spring characteristic acquisition section 88 assumes that the spring characteristic of the dynamic damper 18 is the spring characteristic α. On the other hand, when the total travel distance or the total running time in the vehicle 10 is not more than a predetermined value β determined in advance which is more than the foregoing predetermined value α and allows the spring characteristic of the dynamic damper 18 to be determined to have varied with time to a degree, the spring characteristic acquisition section 88 assumes that the spring characteristic of the dynamic damper 18 is the spring characteristic β. When the total travel distance or the total running time in the vehicle 10 is more than the foregoing predetermined value β, the spring characteristic acquisition section 88 assumes that the spring characteristic of the dynamic damper 18 is the spring characteristic γ.

Figure 7:
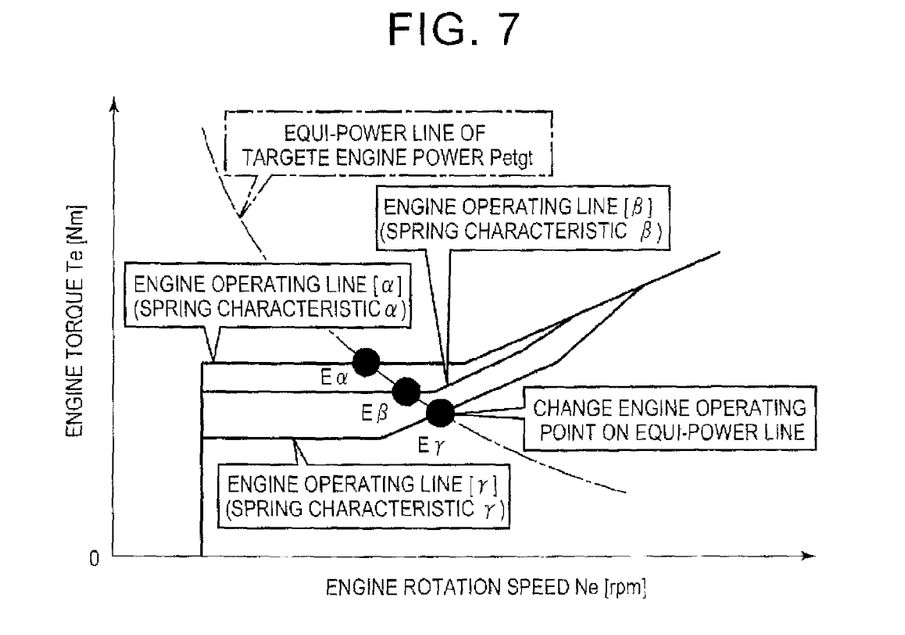
FIG. 7 is a view illustrating an example of engine operating lines in accordance with the spring characteristics, which have been determined in advance as the plurality of execution modes of the rattling sound suppression control in an embodiment different from that in FIG. 3.

As shown in FIG. 7, as the plurality of execution modes of the rattling sound suppression control, the engine operating lines in accordance with the spring characteristics have been determined in advance. In FIG. 7, as the engine operating lines in accordance with the respective spring characteristics α, β, and γ, e.g., engine operating lines [α], [β], and [γ] have been determined in advance. The engine operating line [α] corresponds to the engine operating line [2] of FIG. 3 and is closest to, e.g., the engine fuel efficiency optimum line. On the other hand, the engine operating lines [β] and [γ] are progressively more distant from the engine fuel efficiency optimum line. When the engine operating lines in accordance with the spring characteristics have been determined in advance as in FIG. 7, the spring characteristic sorting section 90 determines whether or not the spring characteristic of the dynamic damper 18 is the spring characteristic α. When the spring characteristic of the dynamic damper 18 is not the spring characteristic α, the spring characteristic sorting section 90 determines whether or not the spring characteristic of the dynamic damper 18 is the spring characteristic β. When the spring characteristic of the dynamic damper 18 is neither the spring characteristic α nor the spring characteristic β, the spring characteristic sorting section 90 determines that the spring characteristic of the dynamic damper 18 is the spring characteristic γ.

Figure 8:
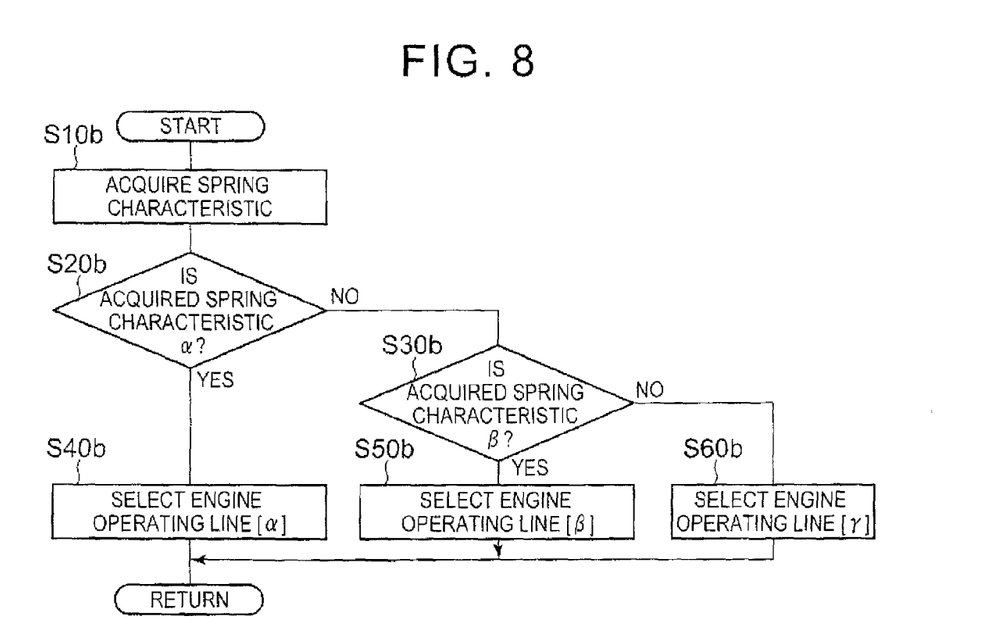
FIG. 8 is a flow chart illustrating the main portion of a control operation by the electronic control unit, i.e., control operation for properly performing the rattling sound suppression control in accordance with the spring characteristic of the dynamic damper in an embodiment different from that in FIG. 4.

FIG. 8 is a flow chart illustrating the main portion of a control operation by the electronic control unit 80, i.e., control operation for properly performing the rattling sound suppression control in accordance with the spring characteristic of the dynamic damper 18. The flow chart is repeatedly executed in an extremely short cycle time of e.g., about several milliseconds to scores of milliseconds. The flow chart of FIG. 8 is still another embodiment corresponding to the flow chart of FIG. 4 in Embodiment 1 described above. Similarly to the flow chart of FIG. 4, the flow chart of FIG. 8 is started on the assumption that, e.g., the rattling-sound-generation-region determination section 86 has determined that the second MG torque Tm2 is in the rattling sound generation region G.

In FIG. 8, first, in S10b corresponding to the spring characteristic acquisition section 88, the spring characteristic of the dynamic damper 18 is acquired based on, e.g., the variation with time of the spring characteristic of the dynamic damper 18. Then, in S20b corresponding to the spring characteristic sorting section 90, it is determined whether or not the spring characteristic of the dynamic damper 18 acquired in S10b described above is the spring characteristic α. When the result of the determination in S20b is negative, it is determined in S30b corresponding to the spring characteristic sorting section 90 whether or not the spring characteristic of the dynamic damper 18 acquired in S10b described above is the spring characteristic β. When the result of the determination in S20b described above is affirmative, in S40b corresponding to the rattling-sound suppression control section 84, the engine operating line [α] (see FIG. 7) determined in advance is selected. Then, the rattling sound suppression control is executed in which the engine 12 is activated at an engine operating point Eα (see FIG. 7) corresponding to the rattling-sound-suppression operating point which is, on the engine operating line [α] and provides the objective engine power Petgt. On the other hand, when the result of the determination in S30b described above is affirmative, in S50b corresponding to the rattling-sound suppression control section 84, the engine operating line [β] (see FIG. 7) determined in advance is selected. Then, the rattling sound suppression control is executed in which the engine 12 is activated at an engine operating point Eβ (see FIG. 7) corresponding to the rattling-sound-suppression operating point which is on the engine operating line [β] and provides the objective engine power Petgt. On the other hand, when the result of the determination in S30b described above is negative, in S60b corresponding to the rattling-sound suppression control section 84, the engine operating line [γ] (see FIG. 7) determined in advance is selected. Then, the rattling sound suppression control is executed in which the engine 12 is activated at an engine operating point Eγ (see FIG. 7) corresponding to the rattling-sound-suppression operating point which is on the engine operating line [γ] and provides the objective engine power Petgt.

As described above, according to the embodiment, the spring characteristic of the dynamic damper 18 is acquired based on the variation with time of the spring characteristic of the dynamic damper 18. Accordingly, by properly performing the rattling sound suppression control in accordance with the variation with time of the spring characteristic of the dynamic damper 18, the rattling sound can properly be suppressed.

Heretofore, the embodiments of the invention have been described in detail on the basis of the drawings. The invention can be practiced by combining the embodiments with each other and is also applicable in another form.

For example, in each of the embodiments described above, in the rattling sound suppression control, the engine operating point (engine operating line) is set to the rattling-sound-suppression operating point (rattling-sound-suppression operating line). The invention is not limited thereto. For example, the rattling sound suppression control may also be executed by performing power running control or regenerative control of the second MG2 such that the second MG torque Tm2 which is out of the rattling sound generation region G is output. In this case, the objective engine power Petgt may also be changed on the basis of the second MG torque Tm2 such that, e.g., the power corresponding to the initial objective engine power Petgt is generated by the drive wheels 40. Alternatively, the rattling sound suppression control may also be executed by executing engine-rotational-fluctuation suppression control for suppressing engine rotational fluctuations. The engine-rotational-fluctuation suppression control suppresses, e.g., an EGR amount or reduces the EGR amount to zero or reduces the amount of the combustion gas remaining in a combustion chamber in the exhaust stroke of the engine 12 to thus suppress explosion fluctuations of the engine 12 in cylinders and suppress the engine rotational fluctuations. Alternatively, the engine-rotational-fluctuation suppression control shifts, e.g., the air-fuel ratio of an air-fuel mixture in the engine 12 toward the lean side or retards the ignition time to thus reduce only the peak value of the engine torque Te, while maintaining the current average value of the engine torque Te, and suppress the engine rotational fluctuations.

Also in each of the embodiments described above, when the second MG torque Tm2 is in the rattling sound generation region G, the rattling sound suppression control is executed. The invention is not limited thereto. For example, it may also be possible to detect whether or not driving torsional resonance has occurred and execute the rattling sound suppression control when the driving torsional resonance has occurred.

Also in each of the embodiments described above, a secular change in the spring characteristic of the dynamic damper 18 is determined on the basis of the total travel distance or total running time in the vehicle 10. The invention is not limited thereto. For example, a secular change in the spring characteristic of the dynamic damper 18 may also be determined on the basis of a thermal load on the dynamic damper 18.

In S10 of FIG. 4 in the embodiment described above, it may also be possible to acquire the spring characteristic of the dynamic damper 18 on the basis of e.g., the transaxle oil temperature THoil and, in S20 and S30, it may also be possible determine, e.g., whether or not the spring characteristic of the dynamic damper 18 acquired in S10 is the prescribed spring characteristic. In S10b of FIG. 8 in the embodiment described above, it may also be possible to acquire the spring characteristic of the dynamic damper 18 by acquiring, e.g., the total travel distance in the vehicle 10 or the like or acquiring the degree of the secular change in the spring characteristic of the dynamic damper 18 based on the total travel distance in the vehicle 10 or the like and, in S20b and S30b, it may also be possible to determine, e.g., whether or not the total travel distance in the vehicle 10 or the like or the degree of the secular change in the spring characteristic of the dynamic damper 18 acquired in S10b is over a prescribed value.

In each of the embodiments described above, the dynamic damper 18 is connected to the counter driven gear 14 via the reduction gear 38. The invention is not limited thereto. It may also be possible to use a configuration in which, e.g., the reduction gear 38 is not provided and the dynamic damper 18 is directly connected to the counter driven gear 14 (counter shaft 28).

In each of the embodiments described above, the power split mechanism 16 is the single-pinion-type planetary gear unit. The invention is not limited thereto. For example, the power split mechanism 16 may also be a double-pinion-type planetary gear unit or a conventional differential gear unit having a bevel gear. Alternatively, the power split mechanism 16 may also be a differential mechanism including a plurality of planetary gear units.

In the invention, the foregoing spring element of the dynamic damper is preferably connected to the output-side rotating member directly or indirectly via the gear mechanism. In the foregoing gear mechanism, e.g., a gear pair which provides connection between two shafts in a power transmissible manner, a single-stage decelerator or accelerator formed of a differential gear unit such as a planetary gear or a bevel gear, and the rotation elements of a plurality of pairs of planetary gear units are selectively connected by a frictional engagement unit to selectively achieve a plurality of gear positions (shift positions). The foregoing gear mechanism is formed of each of various planetary-gear-type multi-stage transmissions having, e.g., two forward shift positions, three forward shift positions, and a larger number of shift positions or the like.

Preferably, as the frictional engagement unit in the foregoing planetary-gear-type multi-stage transmission, a hydraulic frictional engagement unit such as a multiple-disk or single-disk clutch or brake or a belt-type brake which is brought into engagement by a hydraulic actuator is widely used. An oil pump which supplies operating oil for causing engaged operation of the hydraulic frictional engagement unit may also be driven by, e.g., the foregoing engine to eject the operating oil. Alternatively, the oil pump may also be driven by a dedicated MG provided separately from the engine or the like.

Preferably, the foregoing differential mechanism may also be a unit having three rotation elements which are the first rotation element connected to the foregoing engine, the second rotation element connected to the first MG, and the third rotation element connected to the foregoing output-side rotating member.

Preferably, the foregoing differential mechanism is a single-pinion-type planetary gear unit. The foregoing first rotation element may be the CA of the planetary gear unit. The foregoing second rotation element may be the S gear of the planetary gear unit. The foregoing third rotation element may be the R gear of the planetary gear unit.

Note that what has been described above is merely an embodiment and the invention can be implemented in various forms with various changes or improvements made on the basis of the knowledge of those skilled in the art.

What is claimed is:

1. A control device for a hybrid vehicle, the hybrid vehicle including an engine, a first motor generator, a dynamic damper that includes an output-side rotating member, a spring element, and a second motor generator connected to the output-side rotating member so as to transmit a power, the dynamic damper being configured by connecting the output-side rotating member and the second motor generator via the spring element, and a power split mechanism that splits the power from the engine to the first motor generator and to the output-side rotating member, the control device comprising:
an electronic control unit configured to change execution modes of rattling noise suppression control based on a spring characteristic of the dynamic damper, the rattling noise suppression control being a control to suppress rattling noise resulting from rotational fluctuations of the engine.

2. The control device according to claim 1, wherein
the electronic control unit is configured to acquire the spring characteristic based on a temperature of the dynamic damper.

3. The control device according to claim 1, wherein,
the electronic control unit is configured to acquire the spring characteristic based on a rotation behavior of the second motor generator and a rotation behavior of the output-side rotating member.

4. The control device according to claim 1, wherein
the electronic control unit is configured to acquire the spring characteristic based on variation with time of the spring characteristic of the dynamic damper.

5. The control device according to claim 1, wherein
the electronic control unit is configured to execute the rattling noise suppression control when a torque of the second motor generator is within a predetermined range including a value of zero.

6. The control device according to claim 1, wherein
the electronic control unit is configured to
(a) execute the rattling noise suppression control in which an operating line of the engine is set to a rattling-noise-suppression operating line determined in advance, and
(b) select, when changing the execution modes of the rattling noise suppression control, the rattling-noise-suppression operating line to be used for the rattling noise suppression control from among a plurality of rattling-noise-suppression operating lines based on the spring characteristic.

\* \* \* \* \*